United States Patent
Zhang

(10) Patent No.: US 7,678,738 B2
(45) Date of Patent: Mar. 16, 2010

(54) METHOD FOR TREATING SATURATED ACTIVATED COKE

(75) Inventor: Dawei Zhang, Liaoning (CN)

(73) Assignee: Mississippi International Water, Inc., Valley Stream, NY (US)

( * ) Notice: Subject to any disclaimer, the term of this patent is extended or adjusted under 35 U.S.C. 154(b) by 0 days.

(21) Appl. No.: 12/301,524

(22) PCT Filed: May 18, 2007

(86) PCT No.: PCT/CN2007/001620

§ 371 (c)(1),
(2), (4) Date: Nov. 19, 2008

(87) PCT Pub. No.: WO2007/134531

PCT Pub. Date: Nov. 29, 2007

(65) Prior Publication Data

US 2009/0197759 A1    Aug. 6, 2009

(30) Foreign Application Priority Data

May 19, 2006    (CN)    ......................... 2006 1 0080613

(51) Int. Cl.
*C01B 31/08* (2006.01)
(52) U.S. Cl. ..................... 502/423; 502/424; 502/425; 502/426; 502/437; 423/445; 423/447.4; 423/488; 423/449.1; 201/20; 201/26; 201/21; 201/36; 201/35
(58) Field of Classification Search .................. None
See application file for complete search history.

(56) References Cited

U.S. PATENT DOCUMENTS 6,057,262 A * 5/2000 Derbyshire et al. ......... 502/423

6,558,644 B1 * 5/2003 Berman .................. 423/445 R

FOREIGN PATENT DOCUMENTS

| CN | 1086791 A | 5/1994 |
|---|---|---|
| CN | 1313834 A | 9/2001 |
| CN | 1746107 A | 3/2006 |
| JP | 2001-322808 | * 11/2001 |
| JP | 2003-286022 | 10/2003 |

OTHER PUBLICATIONS

JP2001-322808, Nov. 2001, Masasue et al, "Manufacturing method of activated Carbon from sludge"-machine translation of foreign document.*
JP2001-322808, Nov. 2001, Masasue et al, "Manufacturing method of activated Carbon from sludge"-Abstract in english.*

* cited by examiner

*Primary Examiner*—Melvin C Mayes
*Assistant Examiner*—Smita Patel
(74) *Attorney, Agent, or Firm*—Scully, Scott, Murphy & Presser, P.C.

(57) ABSTRACT

A method for treating saturated activated coke comprises the following steps: A) The saturated activated coke is subjected to a dehydration treatment so that the water content in the activated coke is $\leqq 25\%$; B) The product obtained from step A is dried at a starting temperature of 120° C.-150° C.; C) The product obtained from step B is subjected to dry distillation and the condition of the dry distillation is that: by heating to a final temperature for the drying of 500° C.-600° C. at a speed of 4° C.-10° C./min and maintaining for 10-60 minutes, the organics adsorbed on the surface and in the pores of the activated coke is cracked, volatilized and carbonized; D) The product obtained from step C is activated and the activation condition is that: after heating to 800° C.-950° C. at 2° C.-8° C./min, a stream is supplied, wherein the weight ratio of the activated coke to the stream is 1:0.5-5 and the activation time is 0.5-2 h. The activated coke after several times of treatment can be used as the fuel.

3 Claims, 1 Drawing Sheet

METHOD FOR TREATING SATURATED ACTIVATED COKE

FIELD OF THE INVENTION

The present invention relates to a method for the regeneration of activated coke (carbon), and particularly, to a method for treating saturated activated coke (carbon).

BACKGROUND

Activated coke is a carbonaceous material with advanced inner pore structure, large specific surface area and strong adsorption ability, which can be used to treat industrial waste water, urban sewage or the like so as to make the waster water, sewage treatment being reduced in space occupancy, electricity consumption as well as treatment cost and investment cost, and to increase the ability and quality of treating waster water or sewage. Activated coke, during its use, adsorbs organics and inorganics in the waster water or sewage and these pollutants make the activated coke being hydrophobic and occupying active lattices of the activated coke. The successive accumulation of organics makes the activity of the activated coke being decreased gradually, affecting the adsorption performance of the activated coke and makes the adsorption capacity, adsorption speed of the activated coke being decreased greatly. Up to now, there is no report on how to treat and utilize the saturated activated coke after being used to treat waster water, sewage.

DISCLOSURE OF THE INVENTION

An object of this invention is to provide a method for treating saturated activated coke.

The activated coke mentioned in the invention is a coaly filtration adsorption material for treating industrial waster water or urban sewage, which is prepared by the drying, dry distillation, carbonization and activation of anthracite, meager coal, lean coal, rich coal, gas coal, long flame coal, lignite, coke, carbocoal or/and semi-coke powder, coke power as raw material. The saturated activated coke mentioned herein is an activated coke which attains a certain saturated state after being used to treat industrial waster water or urban sewage and if the usage is continued, the treated water will fail to reach the desired water quality.

To realize the above object, the treating method of the invention includes the steps of:

A) Subjecting a saturated activated coke to a dehydration treatment so that the water content in the activated coke is $\leq 25\%$;

B) Drying the product from step A wherein the drying temperature is 120° C.-150° C. and the drying time is 10-30 min;

C) Subjecting the product from step B to a dry distillation & cracking under the conditions of heating to a final temperature of 500° C.-600° C. at a speed of 4° C.-10° C./min and maintaining for 10-60 minutes such that the organics adsorbed on the surface and in the pores of the activated coke is cracked, volatilized and carbonized, wherein a part of the organics is cracked and transformed into a mixture gas containing methane, ethane, hydrogen and carbon monoxide and the mixture gas is conveyed into a boiler via pipelines for combustion application; and the other part of the organics is carbonized into carbides;

D) Activating the product from step C under conditions of heating to 800° C.-950° C. at 2° C.-8° C./min and supplying a stream, wherein the weight ratio of the supplied stream to the saturated activated coke is 0.5-5:1 and the activation time is 0.5-2 h; during the activation, the activated coke subjected to the dry distillation & cracking treatment and the carbides formed by the carbonization of the organics are reacted with the gases of water stream, carbon dioxide and the like so that the activated coke becomes a regenerated activated coke by recovering the pores of the activated coke and generating parts of new pores; during the activation, the carbides become a filtration adsorption material and is mixed with the regenerated activated coke together; and E) After a regeneration treatment of the steps described above, the saturated activated coke used for treating industrial waster water or urban sewage as values of specific surface area and iodine adsorption reaching or exceeding those before being used for treating industrial waster water or urban sewage.

Figure 1:
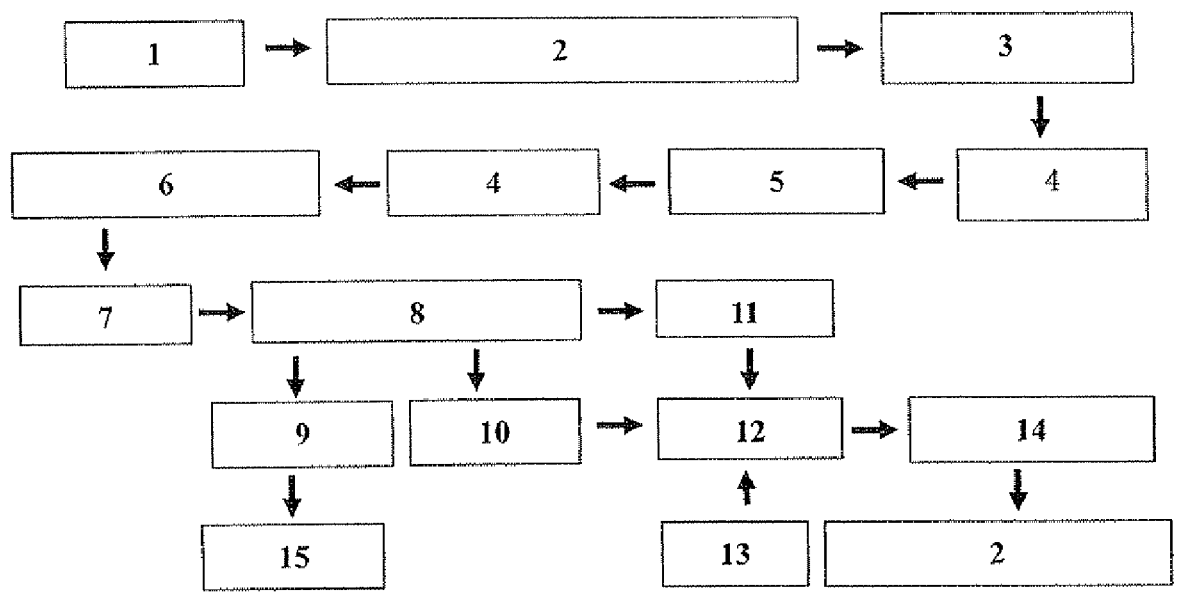
FIG. 1 is a schematic flow chart showing a process for treating saturated activated coke of the invention.

The reference numerals in the drawing represent the meanings of:

1: activated coke
2: industrial waster water or urban sewage
3: saturated activated coke
4: conveyor
5: dehydration device
6: regeneration and activation equipment
7: drying stage
8: dry distillation & cracking stage
9: mixture gas
10: carbides
11: activated coke after being treated at the dry distillation & cracking stage
12: activation stage
13: stream
14: regenerated activated coke
15: boiler

BEST MODE OF CARRYING OUT THE INVENTION

The flow chart of the method for treating the saturated activated coke of the invention is shown in FIG. 1.

The activated coke 1 mentioned in the invention is a coaly filtration adsorption material for treating industrial waster water or urban sewage 2, which is prepared by the drying, dry distillation, carbonization and activation of anthracite, meager coal, lean coal, rich coal, gas coal, long flame coal, lignite, coke, carbocoal or/and semi-coke powder, coke power as raw material.

The saturated activated coke 3 mentioned herein is the activated coke 1 which attains a certain saturated state after being used to treat industrial waster water or urban sewage 2 and if the usage is continued, the treated water will fail to reach the desired water quality.

1) The saturated activated coke 3 is conveyed to the dehydration device 5 for carrying out a dehydration treatment via the conveyor 4 wherein the activated coke after the dehydration treatment has a water content of $\leq 25\%$; the conveyor 4 used in the invention is a well-known spiral conveyor, bucket feeder or belt conveyor; and the dehydration device 5 is a well-known centrifugal dewaterer.

2) The saturated activated coke 3 after being subjected to the dehydration treatment is conveyed into the regeneration and activation equipment 6 by the conveyor 4 to perform regeneration and activation. The regeneration and activation equipment 6 of the invention uses a well-known external heating type rotary kiln, and the rotary processing set for carbocoal filtration material as disclosed in Chinese Patent Publication No. CN1660964 (Application No. 200410100439.8) can also be used. Because the particle diameter of the saturated activated coke 3 after being used to treat industrial waster water, urban sewage 2 is small, it is preferable that the external heating type rotary kiln is used as the regeneration and activation equipment 6. As to the heat energy needed during the regeneration and activation of the saturated activated coke 3, electricity, natural gas, coal gas, coal or the like can be utilized.

3) The regeneration and activation of the saturated activated coke 3 is separated into 3 process stages of a drying stage 7, a dry distillation & cracking stage 8, and an activation stage 12;

A) Drying stage 7: the saturated activated coke 3 after the dehydration is firstly subjected to a drying treatment in the regeneration and activation equipment 6 wherein the starting temperature for the drying is 120° C.-150° C., and the drying time is 10-30 min;

B) Dry distillation & cracking stage 8: the saturated activated coke 3 after being treated in the drying stage 7 is heated at a speed of 4° C.-10° C./min so as to subject the saturated activated coke 3 to the dry distillation & cracking treatment in which the final temperature is 500° C.-600° C. and a constant temperature is kept for 10-60 minutes. During the dry distillation & cracking, as to the organics on the surface and in the pores of the saturated activated coke 3, a part of the organics is cracked and transformed into methane and ethane so as to form the mixture gas 9 consisted of the gases of methane, ethane, hydrogen and carbon monoxide and the like which is conveyed into the boiler 15 via pipelines for combustion application, and the other part of organics is dry distilled and carbonized into carbides 10.

C) Activation stage 12: the activated coke 11 and carbides 10 after being treated in the dry distillation & cracking stage are heated to 800° C.-950° C. at 2° C.-8° C./min and a stream is supplied to perform the activation, wherein the ratio of the amount of the stream 13 supplied to that of the saturated activated coke is 0.5-5:1 and the activation time is 0.5-2 h. During the activation, the activated coke 11 is reacted with the gases of water stream, carbon dioxide and the like so that the activated coke 11 becomes a regenerated activated coke 14 by recovering the pores of the activated coke 1 and generating parts of new pores. The carbonized organics 10 becomes a filtration adsorption material during the activation and is mixed with the regenerated activated coke 14 together.

Example 1

The activated coke 1 used in the example came from Yidong Coal Chemical Co. Ltd., Zhunge'er Qi, Inner Mongolia, China and was a filtration adsorption material for treating industrial waster water or urban sewage which was prepared by drying, dry distillation, carbonization and activation using semi-coke as a raw material.

The saturated activated coke 3 mentioned herein was an activated coke 1 which attained a certain saturated state after a deep treatment of the industrial waster water 2 at a paper making intermediate stage, and if the usage was continued, the treated water would fail to reach the desired quality.

The industrial waster water 2 at a paper making waster water intermediate stage contained the organics of lignins, celluloses, organic acids and the like and was mainly consisted of dissolvable COD (Chemical Oxygen Demand). As to the industrial waster water 2, the COD (Chemical Oxygen Demand) prior treatment was 600 mg/L and the desired COD (Chemical Oxygen Demand) in water after the treatment was below 90 mg/L. After the activated coke 1 has been used for 40 days and when the COD (Chemical Oxygen Demand) adsorbed reached 0.52 g per gram of the activated coke 2, if the usage was continued, the COD (Chemical Oxygen Demand) in the water after the treatment would exceed 90 mg/L and the activated coke 1 would attain a relatively saturated state and became the saturated activated 3, therefore, the saturated activated coke 3 was needed to be subjected to the regeneration and activation treatment.

The saturated activated coke 3 was conveyed to the dehydration device 5 for carrying out the dehydration treatment using the conveyor 4 which was a well-known spiral conveyor and the dehydration device 5 was a well-known centrifugal dewaterer. The saturated activated coke 3 after the dehydration treatment had a water content of 23%, which was conveyed into the regeneration and activation equipment 6 using the conveyor 4 to perform the regeneration and activation treatment. The conveyor 4 was a well-known bucket feeder and the regeneration and activation equipment 6 was a well-known external heating type rotary kiln. The ability for treating the saturated activated coke 3 of the external heating type rotary kiln was 30 tons/day. Coal gas was used as the heat energy needed during the regeneration and activation of the saturated activated coke 3. The external heating type rotary kiln bad an inner cylinder diameter of 1,800 mm, a cylinder length of 18,000 mm and a cylinder rotation speed of 3 rpm wherein the heating chamber outside of the cylinder had a size of 2,460 mm in width, 15,000 mm in length, and 29,000 mm in height.

The regeneration and activation of the saturated activated coke 3 was separated into 3 process stages of a drying stage 7, a dry distillation & cracking stage 8 and an activation stage 12;

A) Drying stage 7: the saturated activated coke 3 after the dehydration was firstly subjected to a drying treatment in the regeneration and activation equipment 6 wherein the starting temperature for the drying was 135° C., and the drying time was 20 min;

B) Dry distillation & cracking stage 8: the saturated activated coke 3 after being treated in the drying stage 7 was heated at a speed of 4° C./min to subject the saturated activated coke 3 to the dry distillation & cracking treatment in which the final temperature was 500° C. and a constant temperature was kept for 60 minutes. During the dry distillation & cracking, as to the organics on the surface and in the pores of the saturated activated coke 3, a part of the organics was cracked and transformed into methane and ethane so as to form the mixture gas 9 consisted of the gases of methane, ethane, hydrogen and carbon monoxide and the like which was conveyed into the boiler 15 via pipelines for combustion application, and the other part of organics was dry distilled and carbonized into carbides 10.

C) Activation stage 12: the activated coke 3 and carbide 10 after being treated in the dry distillation & cracking stage was heated to 800° C. at 2° C./min and a stream was supplied to perform the activation. The ratio of the amount of the stream 13 supplied to that of the saturated activated coke was 0.5:1 and the activation time was 2 h. During the activation, the activated coke 11 was reacted with the gases of water stream, carbon dioxide and the like so that the activated coke 11 became a regenerated activated coke 14 by recovering the pores of the activated coke 1 and generating parts of new pores. The carbonized organics 10 became a filtration adsorption material during the activation and was mixed with the regenerated activated coke 14 together. When the regeneration and activation was carried out, the process of the regeneration and activation was controlled by adjusting the revolution of the cylinder, the temperature in the cylinder and the heating time.

The regenerated activated coke 14 after the regeneration and activation treatment described above was reused in the deep treatment of the industrial water 2 at a paper making intermediate stage in which the COD (Chemical Oxygen Demand) in the waste water prior the treatment was 600 mg/L and the COD (Chemical Oxygen Demand) after the treatment in the water was 61 mg/L.

1) The activated coke 1 before the waster water treatment had an iodine value of 610 mg/g, a particle diameter of 0.2-1.5 mm and a nonuniformity coefficient $K_{80}$ below 2

2) The saturated activated coke 3 after being used to treat the industrial waster water 2 at a paper making intermediate stage had an iodine value of 503 mg/g 3) The regenerated activated coke 14 after the regeneration and activation had an iodine value of 630 mg/g.

The comparison of the effects of the activated cokes before and after the regeneration on treating the waster water in paper making:

| Days of operation | Daily influent before the regeneration mg/L | Daily influent after the regeneration mg/L | Daily effluent before the regeneration mg/L | Daily effluent after the regeneration mg/L |
|---|---|---|---|---|
| 1 | 734 | 561 | 18 | 27 |
| 2 | 413 | 570 | 26 | 30 |
| 3 | 439 | 600 | 37 | 27 |
| 4 | 520 | 518 | 31 | 33 |
| 5 | 580 | 485 | 66 | 38 |
| 6 | 525 | 557 | 60 | 33 |
| 7 | 475 | 499 | 69 | 40 |
| 8 | 493 | 432 | 70 | 55 |
| 9 | 496 | 427 | 77 | 49 |
| 10 | 492 | 460 | 90 | 51 |
| Average value of 10 days | 517 | 511 | 54 | 38 |

Example 2

The activated coke 1 used in the example came from FUGU County, SHANXI Province, China, and was a filtration adsorption material for treating industrial waster water or urban sewage which was prepared by drying, dry distillation, carbonizing and activation using a raw material of the local bitumenite.

The saturated activated coke 3 mentioned herein was an activated coke 1 which attained a certain saturated state after being used to treat the urban sewage 2, and if the usage was continued, the treated water would fail to reach the desired quality.

The water quality condition of the urban sewage 2 is as follows:

| | Items | | | | | |
|---|---|---|---|---|---|---|
| | $BOD_5$ (mg/L) | $CODCr$ (mg/L) | SS (mg/L) | TN (mg/L) | TP (mg/L) | pH |
| Water quality of the influent | ≦140 | ≦360 | ≦150 | ≦35 | ≦3 | 7-8 |

The desired water quality condition of the urban sewage 2 after the treatment using the activated coke 1 is as follows:

| | Items | | | | | |
|---|---|---|---|---|---|---|
| | $BOD_5$ (mg/L) | $CODCr$ (mg/L) | SS (mg/L) | TN (mg/L) | TP (mg/L) | pH |
| Water quality of the effluent | 20 | 60 | 20 | 15 | 1-0.5 | 6-9 |

After the activated coke 1 gas been used for treating the urban sewage 2 for 46 days and when the COD (Chemical Oxygen Demand) adsorbed reached 0.6 g/gram of the activated coke 1, if the usage was continued, the COD (Chemical Oxygen Demand) in the water after the treatment would exceed 60 mg/L and the activated coke 1 would attain a relatively saturated state and became the saturated activated 3, therefore, the saturated activated coke 3 should be subjected to the regeneration and activation treatment.

The saturated activated coke 3 was conveyed to the dehydration device 5 for carrying out the dehydration treatment using the conveyor 4 which was a well-known belt conveyor and the dehydration device 5 was a well-known centrifugal dewaterer. The saturated activated coke 3 after the dehydration treatment had a water content of 25% which was conveyed into the regeneration and activation equipment 6 using the conveyor 4 to perform the regeneration and activation treatment. The conveyor 4 was a well-known bucket feeder, and the rotary processing set for carbocoal filtration material as disclosed in Chinese Patent Publication No. CN1660964 (Application No. 200410100439.8) was used as the regeneration and activation equipment 6, which has an ability for treating the saturated activated coke 3 of 20 tons/day. Natural gas was used as the heat energy needed during the regeneration and activation of the saturated activated coke 3. The external beating type rotary kiln had an inner cylinder diameter of 1,500 mm, an outer cylinder diameter of 2,200 mm, an inner cylinder length of 13,000 mm, an outer cylinder length of 10,000 mm and a cylinder rotation speed of 2 rpm.

The regeneration and activation of the saturated activated coke 3 was separated into 3 process stages of a drying stage 7, a dry distillation & cracking stage 8 and an activation stage 12;

A) Drying stage 7: the saturated activated coke 3 after the dehydration was firstly subjected to a drying treatment in the regeneration and activation equipment 6 wherein the starting temperature for the drying was 120° C., and the drying time was 30 min;

B) Dry distillation & cracking stage 8: the saturated activated coke 3 after being treated in the drying stage 7 was heated at a speed of 10° C./min to subject the saturated activated coke 3 to the dry distillation & cracking treatment wherein the final temperature was 600° C. and a constant temperature was kept for 10 minutes. During the dry distillation & cracking, as to the organics on the surface and in the pores of the saturated activated coke 3, a part of the organics was cracked and transformed into methane and ethane so as to form the mixture gas 9 consisted of the gases of methane, ethane, hydrogen and carbon monoxide and the like, which was conveyed into the boiler 15 via pipelines for combustion application, and the other part of organics was dry distilled and carbonized into carbides 10.

C) Activation stage 12: the activated coke 3 and carbides 10 after being treated in the dry distillation & cracking stage was heated to 950° C. at 8° C./min and a stream was supplied to perform the activation wherein the ratio of the amount of the stream 13 supplied to that of the saturated activated coke was 5:1 and the activation time was 0.5 h. During the activation, the activated coke 11 was reacted with the gases of water stream, carbon dioxide and the like so that the activated coke 11 became a regenerated activated coke 14 by recovering the pores of the activated coke 1 and generating parts of new pores, and the carbonized organics 10 became a filtration adsorption material during the activation and was mixed with the regenerated activated coke 14 together. When the regeneration and activation was carried out, the process of the regeneration and activation was controlled by adjusting the revolution of the cylinder, the temperature in the cylinder and the heating time.

The regenerated activated coke 14 after the regeneration and activation treatment described above was reused in treating the urban sewage 2 and the COD (Chemical Oxygen Demand) of the water after the waster water treatment described above was 50 mg/L.

1) The activated coke 1 before the treatment of the urban sewage 2 had an iodine value of 596 mg/g, a particle diameter of 0.2-1.5 mm and a nonuniformity coefficient $K_{80}$ below 2

2) The saturated activated coke 3 after being used to treat the urban sewage 2 had an iodine value of 477 mg/g 3) The regenerated activated coke 14 after the regeneration and activation had an iodine value of 618 mg/g In the examples described above, the iodine adsorption values were determined using the following method:

(1) The activated coke after a drying treatment is ground into a powder of 200 meshes. Three triangular flasks each loaded with 0.5 g of the activated coke are prepared and are added with 50 ml of iodine liquid respectively, and then oscillated for 15 minutes and rested for 3 minutes. Additionally, three triangular flasks with a mouth covered with a filter paper are prepared and the iodine liquids in the above three flasks are poured into these three filtration flasks and the crude liquids are filtered out.

(2) Additionally, three triangular flasks are prepared and added with 50 ml of distilled water respectively. 10 ml crude liquids are added into each triangular flask to be stirred uniformly.

(3) A titration is carried out using sodium thiosulfate. When the liquid in the triangular flask become light yellow, an indicator is added and the liquid become black. Sodium thiosulfate is dropped again until the liquid becomes colorless and the amount of added sodium thiosulfate is recorded.

(4) The calculation formula of iodine adsorption value is:

$$N = \frac{5(V_1 C_1 - V_2 C_2) \times 127}{0.5}$$

$V_1$ represents the concentration of sodium thiosulfate
$C_1$ represents the consumption amount of sodium thiosulfate
$V_2$ represents iodine concentration (0.1)
$C_2$ represents 10
5, and 127 are constants, respectively
0.5 is the weight of the activated coke in gram

I claim:

1. A method for regenerating a saturated activated coke, comprising the steps of:
    A) a dehydration treatment step of dehydrating the saturated activated coke to reduce water content in the saturated activated coke;
    B) a drying step of drying the product obtained in the dehydration treatment step at 120° C.-150° C.;
    C) a dry distillation step of heating the product obtained in the drying step to 500° C.-600° C. at a speed of 4° C.-10° C./min and keeping at this temperature for 10-60 minutes to carry out a dry distillation; and
    D) an activation step of heating the product obtained in the dry distillation step to 800° C.-950° C. at 2° C.-8° C./min and supplying a stream to carry out an activation,
    wherein in the dry distillation step, a part of organics adsorbed on the surface and in the pores of the activated coke is dry distilled, cracked, volatilized and transformed into a hot coal gas containing methane, ethane, hydrogen and carbon monoxide which is conveyed into a boiler via pipelines for combustion application; and the other part of the organics is dry distilled, carbonized and the carbonized organics is activated into a filtrating adsorption material in the activation step.

2. The method for regenerating saturated coke according to claim 1, wherein the activation step D), the stream is supplied in a weight ratio of the activated coke to the stream of 1:0.5-5, and the activation time is 0.5-2 h.

3. The method for regenerating saturated activated coke according to claim 1, wherein said saturated activated coke is a coal filtration adsorption material which attains a certain saturated state after being used to treat industrial waste water or urban sewage and if the usage is continued, the treated water will fail to reach the desired water quality, and which is prepared by the drying, dry distillation, carbonization and activation of anthracite, meager coal, lean coal, rich coal, gas coal, long flame coal, lignite, coke, carbocoal and/or semi-coke powder, coke power as raw material.

* * * * *